350-266 CROSS REFERENCE SEARCH ROOM 258
237

X2567

Aug. 3, 1965 J. PETERS 3,198,953

AUTOMATICALLY POSITIONED SUN MASK FOR SIGHTING DEVICES

Filed Nov. 15, 1961 4 Sheets-Sheet 1

Inventor:
JOHANNES PETERS
McGlew and Toren
ATTORNEYS

Jnventor:
JOHANNES PETERS
McGlew and Toren
ATTORNEYS

Inventor:
JOHANNES PETERS
McGlew and Toren
ATTORNEYS

AUTOMATICALLY POSITIONED SUN MASK FOR SIGHTING DEVICES

Filed Nov. 15, 1961 4 Sheets-Sheet 4

Jnventor:
JOHANNES PETERS
McGlew and Toren
ATTORNEYS 3,198,953

AUTOMATICALLY POSITIONED SUN MASK FOR SIGHTING DEVICES

Johannes Peters, Deisenhofen, near Munich, Germany, assignor to Bolkow-Entwicklungen Kommanditgesellschaft, Ottobrunn, near Munich, Germany Filed Nov. 15, 1961, Ser. No. 152,602
Claims priority, application Germany, Nov. 16, 1960, B 60,097
8 Claims. (Cl. 250—237)

This invention relates in general to light intensity positioning devices and in particular to a new and useful device for controlling the position of an article such as a mask in an optical system in accordance with the location of the sun's rays.

The invention is particularly directed to an arrangement for masking the sun's rays which ordinarily prevent the clear projection of an object space on an image plane by means of an optical system if the rays of the sun are within the object space. When the rays of the sun are so located, the light density of the sun is ordinarily so high that its image overpowers the images of the objects surrounding the sun image by means of stray light, and, moreover, the sun thermically destroys the receiving surfaces of the image plane.

Prior to the present invention, it has been known to use sun diaphragms or masking devices to prevent the direct impingement of sun rays into an optical system or to filter out predetermined ray portions of the sun prior to projecting an image of an object space. The measures employed, however, either limit the size of the image or, due to the filtering out of the predetermined ray portions, the desired images of the objects to be projected are suppressed to a high degree. In some instances, ante reflex coatings have been deposited on the surfaces of the optical system by vaporization methods to blacken the inner surface of the fittings of the optical system. Such measures suppress stray light rays which otherwise cause a general veiling or fogginess of a picture or image, and also suppress or prevent false sun images which occur due to mirror reflexes at the surfaces of the individual lenses of an optical system. However, such prior art measures do not accomplish a masking of sun rays which directly impinge on the optical system. All of the prior art measures are primarily adapted to counteract the effects of obliquely directed sun rays and are not sufficient to render possible the projection of objects which viewed in the direction toward the sun are in the vicinity of the sun. In such instances, the direct image of the sun falls on the receiving surface of the image plane and this receiving surface is subjected to temperatures in excess of 1000° C. and thereby will be, at least locally, destroyed by heat. In addition, a viewing of the image plane with the eye, for example, with the aid of an occular is, of course, not possible because of the strong radiating sun image.

In accordance with the present invention, there is provided a diaphragm or masking member or surface which is disposed to keep away direct sun rays from the image plane, and means are provided to shift the location of this member to maintain it in a correct masking position in accordance with the position of the sun. This is accomplished by means of an adjusting mechanism which includes photoelectric cell elements which vary the position of the mask in accordance with the shifting of the light intensity sensed by the photoelectric cells. In this manner, the sun which is positioned in front of the optical system is masked so that the objects can be viewed which move in the vicinity of the imaginary line "optical system-sun." The so-called resolving power of an optical position or bearing finding device of this nature is thus broadened to a very considerable degree.

In accordance with one embodiment of the invention, the mask is arranged in front of the optical system and moved under photoelectrical control to provide the shielding necessary for obscuring the sun's rays at the optical system.

In another embodiment, the mask is arranged within the focal plane of the optical system and similar control movement is provided. An advantage of this latter method is that the mask may be made considerably smaller.

A feature of the invention is that the mask consists of a pin of heat resistant reflecting material, for example metal, which is mounted or secured on a light permeable and heat resistant plate in a heat conducting manner. That surface of the pin which faces the objective has a mirror surface and the plate carrying the pin is arranged preferably in a cooling liquid. The halo which surrounds the image of the sun disc is caught by a blackened area of the plate which is disposed concentrically around the pin. A particular advantage of employing the mask at a location of an intermediate image for the masking of the sun rays resides in the fact that the size of the intermediate picture or image can be adapted to the mechanical dimensions of the masking device. The size of the image plane proper can be chosen and dependent on an optical projection scale at any desired size. Since the mask is of a very small size, it does not interfere with the use of the optical system to any extent.

In a preferred arrangement, the adjusting circuit which moves the mask includes two pairs of opposed photoelectric cells which are arranged to shift a plate element which carries the mask as a central pin portion thereof. The potentials built up in each of the photoelectric cells as a result of the light intensity striking such cells is effective to control the position of means for shifting the plate member. Such means advantageously include a fluid pressure device which collapses or expands a bellows adjacent one of the side edges of the plate element carrying the mask which is mounted on the bellows.

The adjustment devices insure that the mask is moved or displaced in a quantity and during a period of time to insure that the amount of light which falls on the two opposing photoelectric cells moving the frame element mounting the mask is maintained equal. The photoelectric cells are set up initially so that the mask is positioned in the desired location. Thereafter the cells insure that the plate is moved automatically in accordance with the migration or movement of the sun picture or image. Such adjusting means may be operated electrically, electropneumatically or electrohydraulically, for example.

Accordingly, it is an object of this invention to provide a light intensity position control device.

A further object of the invention is to provide a means for controlling the positioning of an object in accordance with light intensity.

A further object of the invention is to provide a device including means for masking the sun image and means for positioning the masking means in accordance with the position of the sun.

A further object of the invention is to provide means for masking the sun image in an optical system including means for shifting a mask member in accordance with the position of the sun.

A further object of the invention is to provide a masking device for an optical system including a mask mounted on a transparent plate member and means for shifting the plate member in accordance with the sun's rays.

A further object of the invention is to provide an arrangement for optical systems for masking sun rays to be used in optical system for position finding, bearing or sighting devices, characterized in a mask which is arranged to keep away the sun's rays from an image plane, and including an adjusting circuit which automatically corrects the position of the mask in accordance with the position of the sun.

A further object of the invention is to provide a mask positioning device for an optical system which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

Figures 4, 5, 5A, 6, 7:
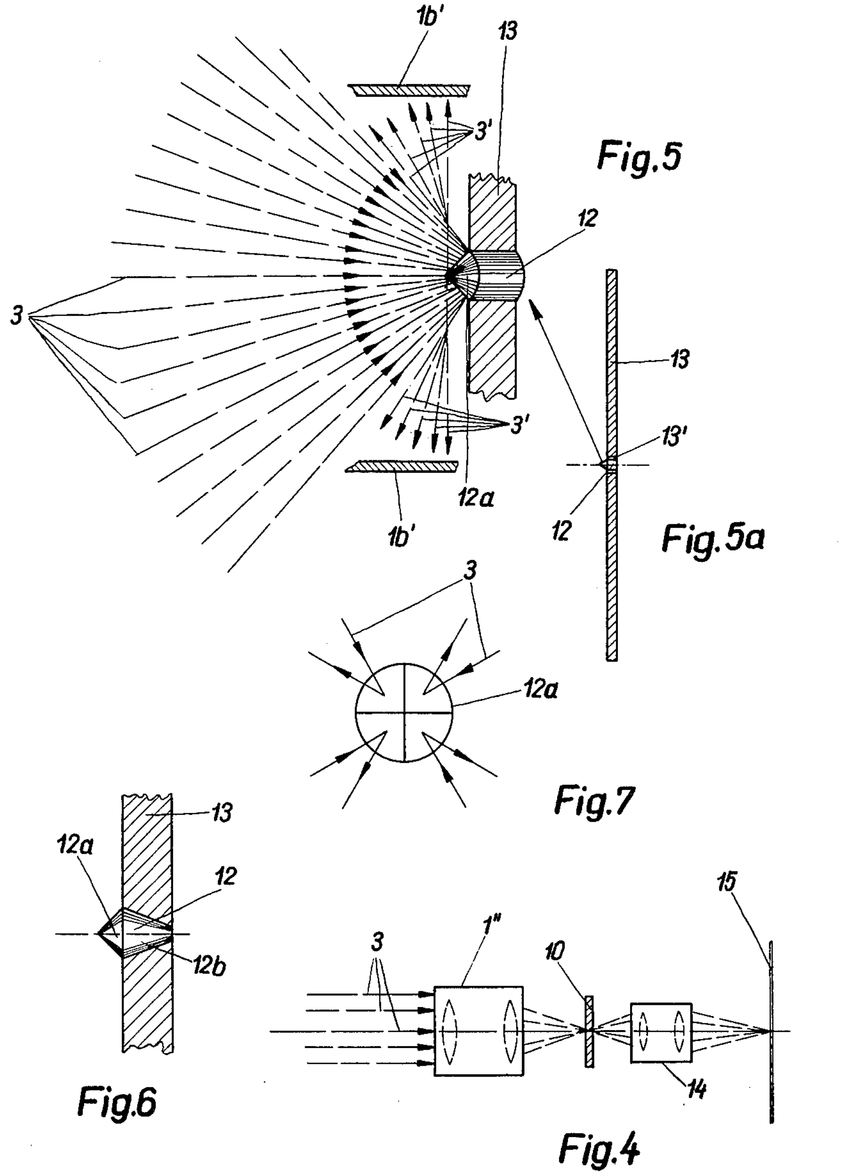
FIG. 4 is another embodiment of the invention wherein the mask is arranged in the intermediate image plane of the optical system.
FIG. 5 is an enlarged representation of a mask construction in accordance with an embodiment of the invention.
Figure 8:
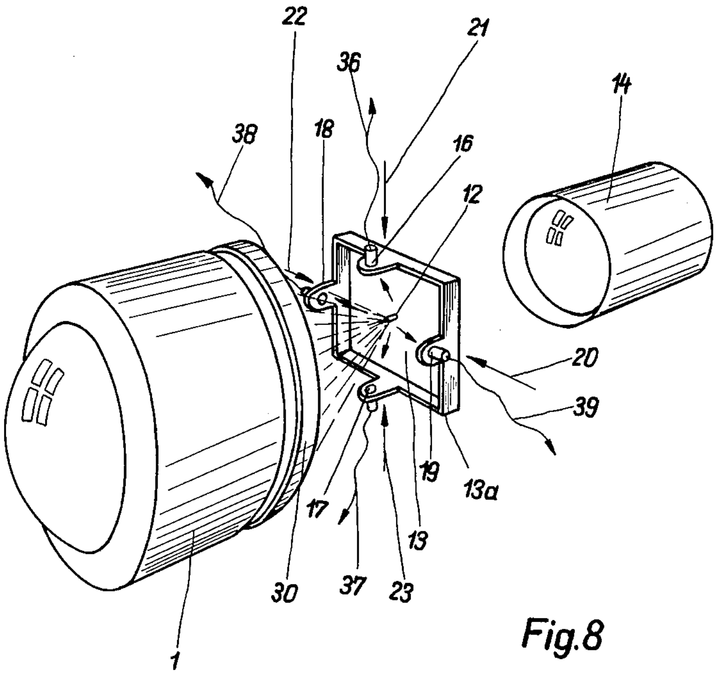
Figures 9, 10:
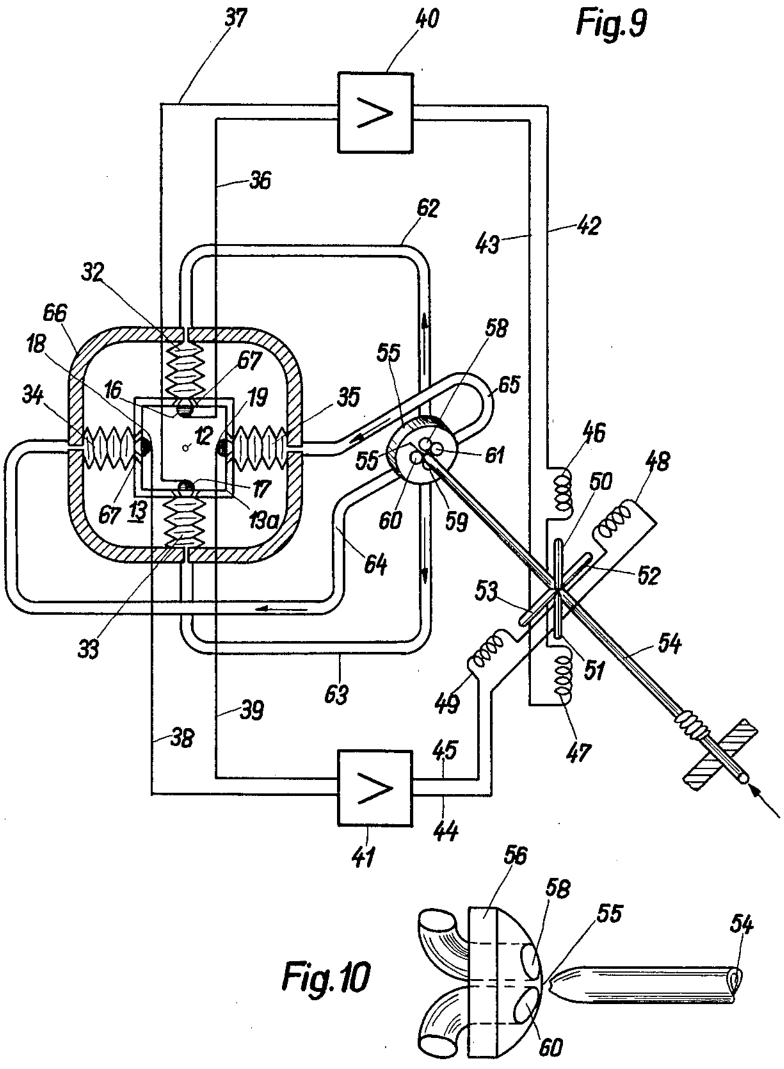

FIG. *5a* is a transverse section of a mask holding plate and mask on a reduced scale from that indicated in FIG. 5;

FIG. 6 is a view similar to FIGS. 5 and *5a* of another embodiment of mask;

FIG. 7 is a front elevation of the pin indicated in FIG. 5;

FIG. 8 is an exploded perspective view of an optical system having an adjustable mask arranged intermediate the image plane of the optical system;

FIG. 9 is a somewhat schematic representation of the mechanism for controlling the positioning of the mask in accordance with the position of the rays of the sun; and FIG. 10 is a fragmentary enlarged elevation of the fluid pressure device for controlling the movement of the bellows of the embodiment indicated in FIG. 9.

Figure 1:
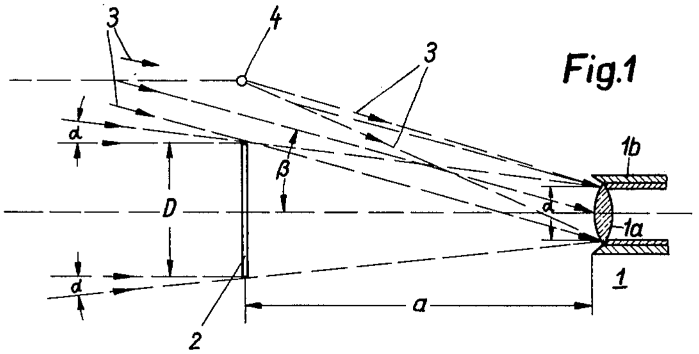
FIG. 1 is somewhat schematic representation of an optical system with a mask arranged in front thereof.

Referring to the drawings in particular, the invention embodied in FIG. 1 includes an optical system 1 which includes a lens 1*a*. A mask 2 is arranged in front of the optical system at a spaced distance $a$ from the edge of the casing or housing 1*b*. The function of the mask 2 arranged in front of the optical system is to cover or mask the entire objective surface against direct sunlight. The diameter D, therefore, must be at least:

$$D=d+2a.tg\alpha \qquad (1)$$

wherein $a$ is the distance between the diaphragm and the objective, $\alpha$ is half the viewing angle which is occupied by the sun and $d$ is the diameter of the objective. The solid or space angle which is partially disturbed by the diaphragm embraces in that instance a cone having the opening:

$$\beta=\text{arc } tg\frac{D+d}{2a}$$
$$=\text{arc } tg\left(\frac{d}{a}+tg\right) \qquad (2)$$
$$\sim\alpha+\text{arc } tg\frac{d}{a}$$

For the purpose of masking the sun only, the mask or diaphragm should be arranged as far as possible away from the objective. However, it has to be at least as large as the objective diameter according to Equation 1 so that no direct sunlight falls into the objective. Further, stray light reaches by means of small extraneous particles, for example dust particles, into the optical system and masks or veils thereby the space around the sun. This phenomena occurs independently from whether or not a diaphragm or mask is present and is identical with the so-called halo.

The optical system 1 is covered against the direct impinging sun rays 3 by the mask 2 arranged at the distance $a$. The diameter D of the diaphragm or mask is larger than the objective diameter of the optical system. This is so for the purpose of preventing stray light, such as would be caused by extraneous dust as dust particles 4, from reaching the optical system. The diameter D of the mask should, however, be slightly larger in accordance with the Equation 1 in order to cover the halo or corona which surrounds the sun.

Figure 2:
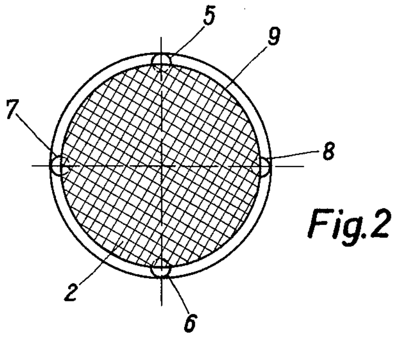
FIG. 2 is a front elevation of a photo-cell mask position control arrangement for the mask indicated in FIG. 1 constructed in accordance with the invention.

In accordance with the invention, the mask 2 which covers the optical system 1 against the sun is to be adjusted in such a manner that the center of the front lens surface of the objective of the optical systems, the mask center and the center of the sun (not shown) lie on one straight line. This adjustment is accomplished by means of an adjustment circuit controlled by photo-cells 5, 6, 7 and 8 arranged at opposite corners of the mask as indicated in FIG. 2. The photo-cells 5, 6, 7 and 8 actuate suitable mechanisms to shift the position of the mask in accordance with the variation and light intensity caused by the sun rays which are sensed by each of the photo-cells so that the mask will be repositioned in accordance with the changing sun position. The optical system 1, of course, is maintained on a rigid optical axis. The photo-cells 5, 6, 7 and 8 are advantageously made of equal sensitivity and the mask 2 is arranged in such a manner that the rim 9 of the shadow which is cast by the mask onto the objective of the optical system 1 partially covers all four photo-cells 5 to 8, as illustrated in FIG. 2. A first adjusting or control circuit which is controlled by the photo-cells 5 and 6 lifts or lowers the mask 2 while a second control circuit which is similar to the first controls the photo-cells 7 and 8 and moves the mask 2 in horizontal direction in order to maintain equal illumination conditions at the photo-cells.

In the embodiment indicated in FIG. 2, electrical motors (not shown) are connected to the photo-cells and arranged to drive mechanisms to shift the mask 2 in accordance with the light intensity sensed by the photo-cells.

The mechanical means which are required for shifting the mask 2, as well as the mask itself, are arranged under a common cover or hood (not shown) which is advantageously transparent and maintained free of foreign substances such as moisture, dust and the like.

Figure 3:
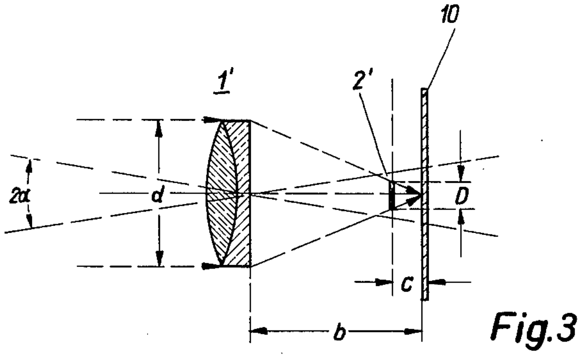
FIG. 3 is another embodiment of the invention indicating the mask on the image side of the optical system.

In FIG. 3 another embodiment is illustrated in which a mask 2' is arranged on the other side of the objective 1*a'* of the optical system 1'. In this embodiment, the size of the mask and its required adjusting region is significantly decreased. The image distance between the optical system and the image plane is designated with $b$ and the distance of the mask from the image plane is designated $c$, then the mask has to have a diameter which corresponds to the equation:

$$D=d\cdot\frac{c}{b}+2(b-c)\cdot tg\alpha \qquad (3)$$

With such an arrangement, a point shaped object will still be projected which differs from the center sun ray by an angle defined by the formula:

$$\beta=\text{arc } tg\frac{D}{2(b-c)}\sim\frac{d\cdot c}{b(b-c)}+\alpha \qquad (4)$$

According to a preferred embodiment of the invention, the mask is arranged in an intermediate image plane of the optical system so that the mask proper is sharply projected on the second image plane. Its diameter is arrived at, at an image distance $d$, corresponding to the focal lens $f$ from the equation:

$$D\sim\frac{1}{100}\cdot f \qquad (5)$$

Thus, the diameter corresponds to the size of the picture of the sun disc and the diffraction halo surrounding it, In FIG. 3, the image plane is indicated at 10.

Assuming an entirely reflection-free objective, the preceding embodiment has the same value as the first embodiment. The last mentioned process of FIG. 3 may be advantageously employed in conjunction with the first mentioned embodiment of the invention. In combining both arrangements, the displacement of the mask which is on the image side of the optical system is relatively simple, as it emanates from the displacement of the outer mask based on the known projective association. The control arrangement which has been described in connection with FIGS. 1 and 2 can be employed in the embodiment of FIG. 3.

Under the assumption that the inner reflection of the objective is suppressed to a far reaching extent, such as by darkening the surfaces, the mask is advantageously arranged in an intermediate image plane of the optical system as indicated in the embodiments of FIGS. 4 to 8 of the drawings. In FIG. 4, the sun rays 3 enter the optical system 1'' and cast an intermediate image at 10, and is directed through an objective 14 to an ultimate image plane 15. A mask in this case is of very small diameter which corresponds at image distance D corresponding to the focal length $f$ to the equation:

$$D \sim \frac{1}{100} \cdot f \qquad (5)$$

The mask, however, has to absorb a substantial part of the light emission which is taken up by the substantially larger front surface of the optical system minus the energy losses which occur in the optical system.

In the intermediary image plane, particularly at the image of the sun disc, there occurs for this reason an exceedingly high energy density. Assuming the objective permits passage of about 50% of the sun radiation of 1.4 calories per square centimeter per minute, an energy of 0.05 watt has to be conducted away by the mask per square centimeter of the front lens surface of the optical system. The absorbed heat quantity Q amounts at a diameter $D=f:n$ about:

$$Q=\frac{1/2.2\pi(f/n)^2.0.05}{1/4.2\pi(f/100)}=0.05(1-0/n)^2$$

Thus, for an objective having an opening of $f$:2 there occurs at the mask a heat load of 125 watts per square centimeter which corresponds to the heat load of an electric immerser. In order to control such a heat load, in accordance with the invention, the mask is constructed in the form of a metal pin 12 which is mounted in heat conducting manner on a light permeable but heat resistant plate 13 (see FIGS. 5 and 5*a*). The metal pin on the side facing the objective is either cone-shaped, as indicated in FIGS. 5 and 5*a*, or pyramid-shaped, as indicated in FIGS. 6 and 7, and has a mirror surface so that as little as possible of the radiation is thrown back toward the objective. As indicated in FIG. 5, the rays of the sun 3 which pass the walls 1*b'* of the optical system are reflected as rays 3' by the cone 12*a* against the darkened interior surface 1*b'*, as indicated. In view of the fact that image points outside the mask 2 should be influenced as little as possible, it is advantageous to construct the mask 12 with a sharply inclined conical surface 12*b*, as indicated in FIG. 6. In addition, it is advantageous to insure that the heat resistant plate 13 includes a blackened concentric ring 13' (FIG. 5*a*) provided to mask the halo about the sun which will be formed around the pin 12.

In accordance with a preferred arrangement, the plate 10 is arranged in a cooling liquid (not shown) which is agitated by means of pumps (not shown) or the plate 10 is cooled in an air current as indicated in FIG. 9. The cooling circuit may advantageously provide, at the same time, means for moving the mask under the control of an adjusting circuit.

Referring to FIG. 9, the plate 13 carrying the mask 12 is suspended at two opposite sides top and bottom by oppositely disposed bellows 34 and 35 and 32 and 33, respectively. Four photo-cells 16, 17, 18 and 19 control the positioning of the plate and the mask 12 by actuating means to control fluid to compress or retract the bellows 32, 33, 34 and 35 to maintain equal light intensity on all of the photoelectric cells. The photo-cells are advantageously located to compensate for the intensity of light reflected by the metal pin 12. The bellows are mounted in an enclosing frame 66.

The photo-cells 32, 33, 34 and 35 are connected via lines 36, 37, 38 and 39, respectively, each with an amplifier 40 and 41. Each amplifier 40 and 41 is connected via lines 42, 43, 44 and 45, respectively, with two in series connected magnetic windings 46, 47, and 48, 49, respectively. Four soft iron cores are secured on elastically mounted and concentrically rotatable pipes 54. Each core forms with the magnetic winding pertaining thereto a solenoid for deflecting or steering the pipe 54. It should be appreciated the pipe 54 and the cores 51, 52 and 53 are indicated schematically, but the pipe is rotated concentrically in order to position an end thereof in alignment with one or more openings 58, 59, 60 and 61, in order to direct more or less fluid into one of four conduits 62, 63, 64 and 65, which supply respective ones of the bellows 32, 33, 34 and 35. Compressed air is directed through the pipe 54 and discharges through a tip 55 into one or more of the openings in order to maintain the balanced positioning of the plate 13 and to properly located the mask 12. Excess fluid is discharged around the photostats against the plate 13 for cooling purposes through openings 67.

At the pairs of photo-cells 16 and 17 and 18 and 19, respectively, there occurs upon some light impingement pair-wise voltage or potential differentials which, via the amplifiers 40 and 41 and the magnetic windings 46 and 47, 48 and 49, respectively, adjust the movable pipe 54 with regard to the openings 58, 61, which are opposite the nozzle 55. The pressure directed to the bellows 32–35 moves the plate 13 in accordance with the sun position in the direction of the arrows 20, 21, 22 and 23, as indicated in FIG. 8, in accordance with the control called for by the photoelectric cells. The arrangement is chosen, for example, in a manner that the bellows will push the plate 13 downwardly in the case when the photo-cell 16 is more intensely illuminated by the light reflected from the pin 12 than the illumination of the photo-cell 17. The corresponding applies for the horizontal displacement directions 22 and 23. The air which is introduced into the pressure bellows may escape through the opening 67 provided in the rim 13*a* of the plate 13 and acts to conduct away heat which accumulates in the plate 13.

For discharging or dissipating the heat, it is also feasible to build a plate 13 with the photo-cells arranged in a transparent envelope or vessel which is filled with a cooling liquid. In such an event, the actuating members for the plate 13 would advantageously be electro-hydraulic.

In order to suppress to a further extent the inner reflection of the sun rays which are masked by the metal pin 12, there is arranged on the side of the masking device which faces the objective of the optical system 1 a selected filter 30, as indicated in FIG. 8, in order to absorb the reflected sun rays.

As mentioned in the embodiment of the convention in FIGS. 4 to 9, the mask is arranged in a picture or image plane of the optical system. The image plane, therefore, for the purpose of observation or reproduction must be reproduced or projected on a second image plane 15 by means of an additional objective 14, as indicated in FIG. 4. In so doing, the magnitude of the intermediate picture 10 can be chosen so that it is most suitable for the mechanical dimensions of the masking device.

The image reproduction of the image plane 15 may, nevertheless, be carried out in any desired size because the additional objective 14 can have a projection scale of any desired size.

While specific embodiments of the invention have been shown and described in detail to illustrate the application of the inventive principles, it will be understood that the invention may be embodied otherwise without departing from such principles.

What is claimed is:

1. A device for masking sun rays in optical systems for position finding, bearing and sighting devices and the like, comprising an optical system having an intermediate image plane, a mask for keeping away the sun rays from the image plane of the device located in said intermediate image plane, and adjusting means connected to said mask including means exposed to the sun to move said mask in accordance with movement of the sun, said mask being mounted on a transparent plate, said optical system including an intermediary plane, said plate being light permeable and heat resistant, said mask including a metal pin located at the center of said plate.

2. A device for masking sun rays in optical systems for position finding, bearing and sighting devices and the like, comprising an optical system having an intermediate image plane, a mask for keeping away the sun rays from the image plane of the device located in said intermediate image plane, and adjusting means connected to said mask including means exposed to the sun to move said mask in accordance with movement of the sun, said mask being mounted on a transparent plate, said optical system including an intermediary plane, said plate being light permeable and heat resistant, said mask including a metal pin located at the center of said plate, said pin having a side facing the objective of the optical system which is cone-shaped and has a reflecting surface.

3. A device for masking sun rays in optical systems for position finding, bearing and sighting devices and the like, comprising an optical system having an intermediate image plane, a mask for keeping away the sun rays from the image plane of the device located in said intermediate image plane, and adjusting means connected to said mask including means exposed to the sun to move said mask in accordance with movement of the sun, said mask being mounted on a transparent plate, said optical system including an intermediary plane, said plate being light permeable and heat resistant, said mask including a metal pin located at the center of said plate, said pin having a side facing the objective of the optical system which is cone-shaped and has a reflecting surface, and a filter disposed between said plate and the objective, which filter absorbs reflected sun rays.

4. A light masking device comprising an optical system having an intermediate image plane, a light permeable plate disposed in the intermediate image plane of said optical system, a mask centered in said plate, adjustable mounting means for said plate for positioning said plate in respect to said optical system, photo-cell means including opposed photo-cells for centering said plate for equal light intensity from side to side up and down, and adjusting means connected to said photo-cell means and said adjustable mounting means to move said mounting means to shift said plate in accordance with variations of light sensed by said photo-cell means, said mask including a pin having a reflective surface disposed on the side to receive and reflect the rays of the sun when the optical system is aimed at the sun.

5. A light masking device comprising an optical system having an intermediate image plane, a light permeable plate disposed in the intermediate image plane of said optical system, a mask centered in said plate, adjustable mounting means for said plate for positioning said plate in respect to said optical system, photo-cell means including opposed photo-cells for centering said plate for equal light intensity from side to side up and down, and adjusting means connected to said photo-cell means and said adjustable mounting means to shift said plate in accordance with variations of light sensed by said photo-cell means, said optical system including an intermediary image plane, at least two objectives on each side of said intermediary plane, and a second image plane.

6. A light masking device according to claim 4, wherein said reflective surface is conical.

7. A light masking device according to claim 4, wherein said reflective surface is of pyramid configuration.

8. A light masking device according to claim 4, wherein said pin includes a conical wall portion which extends in said mounting plate.

References Cited by the Examiner

UNITED STATES PATENTS

| | | | |
|---|---|---|---|
| 2,155,402 | 4/39 | Clark | 250—203 X |
| 2,369,622 | 2/45 | Toulon | 250—203 X |
| 2,378,744 | 6/45 | Annen | 250—234 X |
| 2,604,601 | 7/52 | Menzel | 250—203 X |
| 2,655,848 | 10/53 | Gray | 250—229 X |
| 2,712,772 | 7/55 | Trombe | 88—1 |
| 2,800,591 | 7/57 | Gilman | 250—83 |
| 2,967,249 | 1/61 | Quirk | 250—215 |
| 2,993,125 | 7/61 | Geer et al. | 250—203 X |
| 3,020,406 | 2/62 | Whitney | 250—83.3 |
| 3,035,489 | 5/62 | Simons | 250—237 X |

RALPH G. NILSON, *Primary Examiner.*